US012784741B2

(12) United States Patent
Kim et al.

(10) Patent No.: US 12,784,741 B2
(45) Date of Patent: Nov. 3, 2026

(54) MULTI-MODALITY VOICE RECOGNITION DEVICE AND METHOD

(71) Applicant: ELECTRONICS AND TELECOMMUNICATIONS RESEARCH INSTITUTE, Daejeon (KR)

(72) Inventors: Yoonhyung Kim, Daejeon (KR); Byung Ok Kang, Daejeon (KR); Hwa Jeon Song, Daejeon (KR); Inkyu An, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 163 days.

(21) Appl. No.: 18/909,282

(22) Filed: Oct. 8, 2024

(65) Prior Publication Data

US 2025/0218427 A1 Jul. 3, 2025

(30) Foreign Application Priority Data

Jan. 3, 2024 (KR) ........................ 10-2024-0000780

(51) Int. Cl.
*G10L 15/06* (2013.01)
*G10L 15/02* (2006.01)

(52) U.S. Cl.
CPC ............ *G10L 15/063* (2013.01); *G10L 15/02* (2013.01)

(58) Field of Classification Search
CPC .............................. G10L 15/063; G10L 15/02
See application file for complete search history.

(56) References Cited

U.S. PATENT DOCUMENTS 11,615,781 B2 3/2023 Braga
2011/0282665 A1 11/2011 Kim et al.
(Continued)

FOREIGN PATENT DOCUMENTS

JP 2011-059186 A 3/2011
KR 10-2021-0054961 A 5/2021
KR 10-2022-0126324 A 9/2022

OTHER PUBLICATIONS

Yemini, Yochai, et al. "Lipvoicer: Generating speech from silent videos guided by lip reading." International Conference on Learning Representations. vol. 2024. 2024. (Year: 2024).*
(Continued)

*Primary Examiner* — Edgar X Guerra-Erazo
*Assistant Examiner* — Edward Tracy, Jr.
(74) *Attorney, Agent, or Firm* — LRK PATENT LAW FIRM

(57) ABSTRACT

A multi-modality voice recognition device is provided. The multi-modality voice recognition device includes a video encoder trained to receive a lip video to a video encoder to extract visual feature information for voice recognition, an audio encoder trained to receive a voice to extract voice feature information for voice recognition, a modality reconstructor trained to reconstruct the voice feature information from the visual feature information to generate reconstruction voice feature information, a random selector configured to randomly output one of the voice feature information and the reconstruction voice feature information, and a video-audio decoder trained to receive a multi-modality feature, where the visual feature information is connected to an output of the random selector, to output a character string which is a voice recognition result.

8 Claims, 5 Drawing Sheets

(56) References Cited

U.S. PATENT DOCUMENTS

| | | | |
|---|---|---|---|
| 2014/0112556 | A1* | 4/2014 | Kalinli-Akbacak ........................ G06V 40/176 382/128 |
| 2014/0145931 | A1 | 5/2014 | Kim et al. |
| 2018/0233142 | A1* | 8/2018 | Koishida .................. G01S 5/28 |
| 2021/0035563 | A1* | 2/2021 | Cartwright ............ G10L 15/063 |
| 2022/0115002 | A1 | 4/2022 | Gong |

OTHER PUBLICATIONS

Yochai Yemini et al., "LipVoicer: Generating Speech from Silent Videos Guided by Lip Reading", aXiv_2306.03258v1(Jun. 5, 2023).

* cited by examiner

MULTI-MODALITY VOICE RECOGNITION DEVICE AND METHOD

CROSS-REFERENCE TO RELATED APPLICATION(S)

This application claims the benefit of the Korean Patent Application No. 10-2024-0000780 filed on Jan. 3, 2024, which is hereby incorporated by reference as if fully set forth herein.

BACKGROUND

1. Field of the Invention

The present disclosure relates to a multi-modality voice recognition device and method, and more particularly, to a multi-modality voice recognition device and method in which a video is compatible with a video-voice input signal.

2. Description of Related Art

As deep learning has advanced, single modality-based voice recognition technology processing an audio signal has been enhanced in performance and is being applied to various fields recently. However, there is a case where it is difficult or impossible to perform voice recognition in some service environments, based on only a voice (audio) input. For example, a problem occurs where voice recognition is limited in a multi-utterer environment where utterances of several persons overlap one another or a high noise environment where a signal to noise ratio (SNR) is low.

To overcome such a limitation, research is being recently done on a model which uses lip action information about a person for voice recognition. Lip reading which is video-based voice recognition is technology which recognizes a voice by using only video information without voice information, and moreover, is technology which complementally recognizes a voice by simultaneously using a voice and video information. Such a method has enhanced recognition performance through an action of a lip shape even when the quality of an audio signal is low or a portion thereof is omitted.

However, in conventional technology, the performance of a different kind of modality input signal is largely reduced in a learning step due to a characteristic of a deep learning model. For example, video-voice modality-based voice recognition has low performance in a video modality-based voice recognition problem, and even in an opposite case, shows the same tendency. An utterance size or noise intensity is continuously changed based on a peripheral environment in a real environment, or a case where an audio signal is restricted due to an utterance overlap between utterers, and due to this, in such situations, conventional technology suitable for only a specific modality input condition is reduced in utility and reliability.

PRIOR ART REFERENCE

Patent Document

Korean Patent Publication No. 10-2022-0126324 (2022.09.16)

SUMMARY

An aspect of the present disclosure is directed to providing a multi-modality voice recognition device and method which may perform video-based voice recognition and video-voice-based voice recognition by using a single deep learning model.

The objects of the present invention are not limited to the aforesaid, but other objects not described herein will be clearly understood by those skilled in the art from descriptions below.

To achieve these and other advantages and in accordance with the purpose of the invention, as embodied and broadly described herein, there is provided a multi-modality voice recognition method performed by a multi-modality voice recognition device, the multi-modality voice recognition method including: a step of performing training to input a lip video to a video encoder to extract visual feature information for voice recognition; a step of performing training to input a voice to an audio encoder to extract voice feature information for voice recognition; a step of training a modality reconstructor to reconstruct the voice feature information from the visual feature information to generate reconstruction voice feature information; a step of outputting one of the voice feature information and the reconstruction voice feature information through a random selector; and a step of performing training to input a multi-modality feature, where the visual feature information is connected to an output of the random selector, to the video-audio decoder to output a character string which is a voice recognition result.

In another aspect of the present invention, there is provided a multi-modality voice recognition device including: a video encoder trained to receive a lip video to a video encoder to extract visual feature information for voice recognition; an audio encoder trained to receive a voice to extract voice feature information for voice recognition; a modality reconstructor trained to reconstruct the voice feature information from the visual feature information to generate reconstruction voice feature information; a random selector configured to randomly output one of the voice feature information and the reconstruction voice feature information; and a video-audio decoder trained to receive a multi-modality feature, where the visual feature information is connected to an output of the random selector, to output a character string which is a voice recognition result.

In another aspect of the present invention, there is provided a multi-modality voice recognition method performed by a multi-modality voice recognition device, the multi-modality voice recognition method including: a step of inputting a lip video to a pretrained video encoder to extract visual feature information for voice recognition; a step of inputting a voice to a pretrained audio encoder to extract voice feature information for voice recognition; a step of inputting a voice to a pretrained SNR estimator to estimate a signal to noise ratio (SNR) estimation value of the voice; a step of inputting the extracted visual feature information to a pretrained modality reconstructor to extract reconstruction voice feature information; a step of selecting voice feature information when the SNR estimation value is greater than a threshold value and selecting reconstruction voice feature information when the SNR estimation value is less than or equal to the threshold value; and a step of connecting one of the selected voice feature information and reconstruction voice feature information with the visual feature information to input to a pretrained video-audio decoder to thereby output a voice recognition result.

A computer program according to another aspect of the present invention may execute a multi-modality voice recognition device and method and may be stored in a computer-readable recording medium.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION OF THE INVENTION

Figure 1:
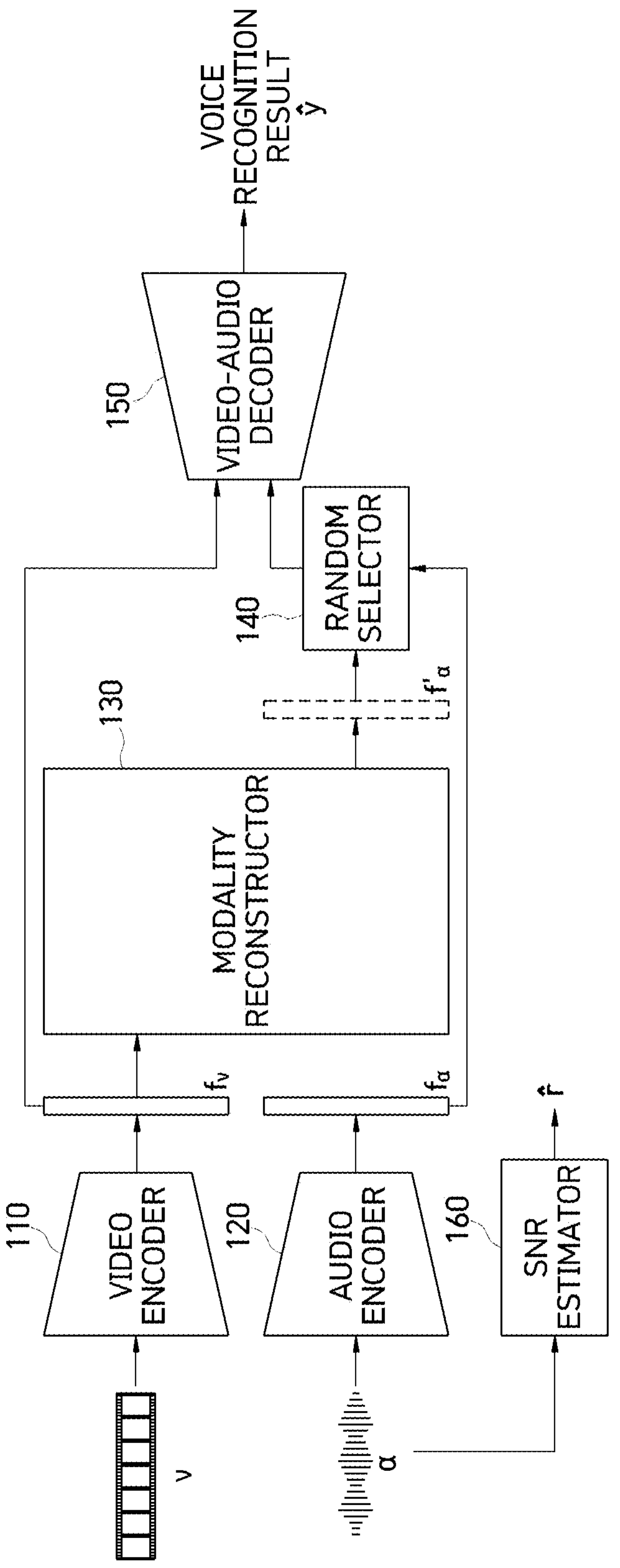
FIG. 1 is a diagram for describing a learning process of a voice recognition device according to an embodiment of the present invention.

Reference will now be made in detail to the exemplary embodiments of the present disclosure, examples of which are illustrated in the accompanying drawings. Wherever possible, the same reference numbers will be used throughout the drawings to refer to the same or like parts.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Herein, like reference numeral refers to like element, and "and/or" include(s) one or more combinations and each of described elements. Although "first" and "second" are used for describing various elements, but the elements are not limited by the terms. Such terms are used for distinguishing one element from another element. Therefore, a first element described below may be a second element within the technical scope of the present invention.

Unless otherwise defined, all terms (including technical and scientific terms) used herein may be used as a meaning capable of being commonly understood by one of ordinary skill in the art. Also, terms defined in dictionaries used generally are not ideally or excessively construed unless clearly and specially defined.

The present invention relates to a multi-modality voice recognition device and method.

An embodiment of the present invention may provide a device and a method, which may perform video-based voice recognition and video-voice-based voice recognition by using a single deep learning model, and a method of training the method. In this case, the single deep learning model may perform a function under all of two modality conditions and may select and flexibly use an operation mode in a real application environment, based on an input modality condition or noise intensity (SNR) estimation result. Particularly, an embodiment of the present invention may improve voice recognition performance by using lip action information about a person in a situation where the quality of an audio signal is low or is not assigned.

Hereinafter, a multi-modality voice recognition device 100 according to an embodiment of the present invention will be described with reference to FIGS. 1 to 4.

FIG. 1 is a diagram for describing a learning process of the voice recognition device 100 according to an embodiment of the present invention.

The voice recognition device 100 according to an embodiment of the present invention may include a video encoder 110, an audio encoder 120, a modality reconstructor 130, a random selector 140, and a video-audio decoder 150.

The video encoder 110 may be trained to receive a lip video v and extract visual feature information $f_v$ for voice recognition. The video encoder 110 may be trained to effectively encode visual information from an input lip video and extract visual feature information having a form capable of being understood by a model.

The audio encoder 120 may be trained to receive a voice a and extract voice feature information $f_a$ for voice recognition. The audio encoder 120 may convert an input audio signal into a voice feature capable of interpretation and may allow a model to understand and use voice information.

The modality reconstructor 130 may be trained to reconstruct voice feature information $f_a$ from the visual feature information $f_v$ to generate reconstruction voice feature information $f_a$. The modality reconstructor 130 may predict and reconstruct voice feature from the visual feature information in a scenario (video modality-based voice recognition) where voice information is omitted, and thus, may decrease information loss caused by the omission of modality.

In an embodiment, the modality reconstructor 130 may be trained based on a loss function based on a distance between the visual feature information and the reconstruction voice feature information. In this case, a loss function applied to the modality reconstructor 130 may be expressed as the following Equation 1.

$$\mathcal{L}_{recon} = d(f_a, f_a') \quad \text{[Equation 1]}$$

In Equation 1, d(·, ·) may denote a function which measures a distance between two features, and L1, L2, cosine, and Euclidean distance may be used.

The random selector 140 may randomly extract one of the voice feature information $f_a$ and the reconstruction voice feature information $f'_a$. The random selector 140 may be applied to only a learning process.

In an embodiment, when an output of the random selector 140 is the voice feature information $f_a$, a video-voice modality-based voice recognition scenario may be applied, and when an output of the random selector 140 is the reconstruction voice feature information $$f_a',$$

a video modality-based voice recognition scenario may be applied. In this manner, the random selector 140 may induce a model to learn all of two scenarios in a learning process. This may be for allowing the model to learn various input conditions and features occurring in the two scenarios. A model trained through the random selector 140 may flexibly respond to conversion between the two scenarios when being actually applied, and this may contribute to enhance voice recognition performance in a real application environment.

The video-audio decoder 150 may be trained to receive a multi-modality feature where the visual feature information is connected to an output of the random selector 140 and output a character string which is a voice recognition result. In this case, a loss function which is applied in a process of learning the video-audio decoder 150 may be expressed as the following Equation 2.

$$\mathcal{L}_{ce} = -\frac{1}{T}\sum_{t=1}^{T}\sum_{i=1}^{V} y_{t,i}\log(\hat{y}_{t,i}) \quad \text{[Equation 2]}$$

In Equation 2, V may denote a sum of elements of a token (recognition unit) set, and T may denote a length of a token (the number of tokens) configuring a right answer sentence. Also, $y_{t,i}$ and $$\hat{y}_{t,i}$$

may each denote a probability of an $i^{th}$ token at a time t of a right answer and a time t of a prediction result. That is, in an embodiment of the present invention, the video-audio decoder 150 may be trained based on a loss function configured with a token probability value at an arbitrary time on a right answer and a prediction result, a sum of elements of a token set which is a recognition unit, a length of a token configuring a right answer sentence.

The following Equation 3 may represent a total loss function for voice recognition and may be represented by a sum of a loss function applied to the modality reconstructor 130 and a loss function applied to the video-audio decoder 150.

$$\mathcal{L}_{asr} = \mathcal{L}_{ce} + \alpha\mathcal{L}_{recon} \quad \text{[Equation 3]}$$

In Equation 3, α may denote a constant which determines a weight between two loss functions and may have a value within a range of [0, 1]. Based on the application of such a loss function $L_{asr}$, an embodiment of the present invention may function as an overall loss function for training a robust model on modality omission along with accurate voice recognition.

Furthermore, in an embodiment of the present invention, the voice recognition device 100 may further include an SNR estimator 160 which is trained to estimate a signal to noise ratio (SNR) of a voice, based on receiving the voice. In this case, the SNR estimator 160 may be trained through a loss function such as the following Equation 4 to output an estimation $SNR^{\hat{r}}$ from an input audio signal α and minimize a difference with a right answer $SNR^{r}$.

$$\mathcal{L}_{snr} = d(r, \hat{r}) \quad \text{[Equation 4]}$$

In Equation 4, r may denote a right answer SNR, and $\hat{r}$ may denote an estimation SNR estimated by a model. A function d(·, ·) may be a function which measures a difference or a distance between two values and may be used for representing a difference between a right answer and prediction. The SNR estimator 160 trained to minimize such a loss function may be trained to accurately estimate an SNR of an input audio signal and may allow a model to perform accurate estimation in a high SNR and robustly respond in a low SNR.

Moreover, in an embodiment of the present invention, the video encoder 110, the audio encoder 120, the video-audio decoder 150, and the SNR estimator 160 may all have a weight capable of learning and may be configured in an attention structure of a transformer, and thus, may dynamically adjust a weight on each portion of an input to extract and process information.

On the other hand, the random selector 140 may not be trained. That is, the random selector 140 may perform a function of randomly selecting one of two inputs, and a weight may not be adjusted in learning. However, by applying the random selector, an embodiment of the present invention may train a case where a video and a voice are input, in addition to a case where a video is input, based on only a single deep learning model, and may be applied to two cases.

Figure 2:
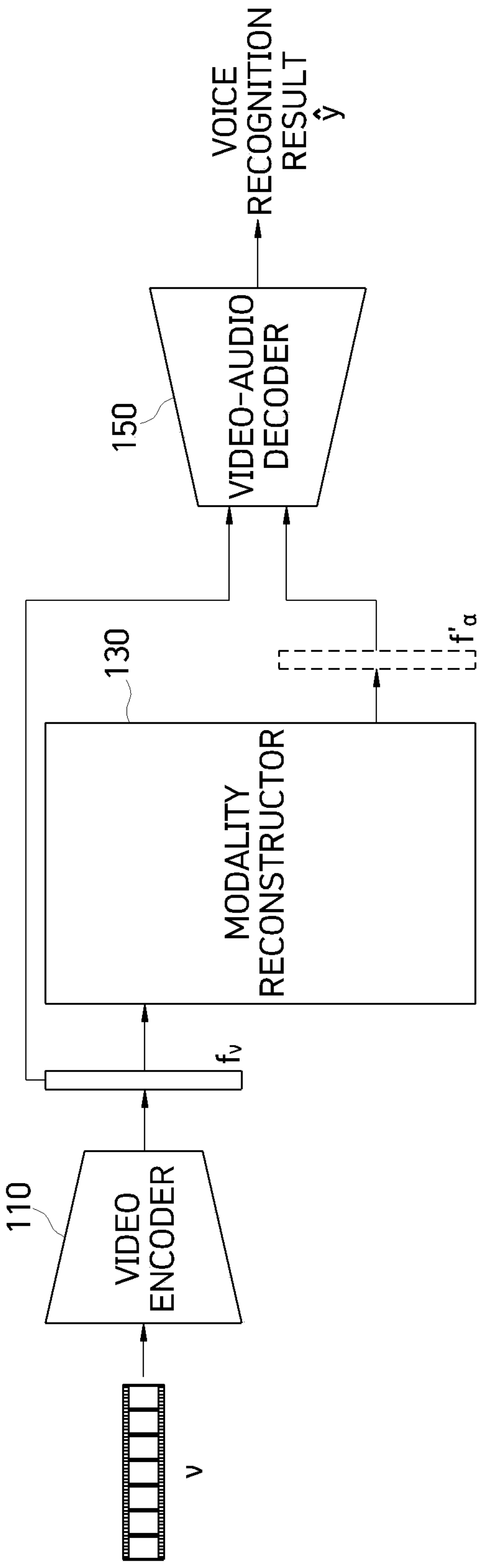
FIG. 2 is a diagram for describing an application embodiment of a voice recognition device based on a video modality input according to an embodiment of the present invention.

FIG. 2 is a diagram for describing an application embodiment of a voice recognition device 100 based on a video modality input according to an embodiment of the present invention.

In a situation where learning on the voice recognition device 100 is completed and then only a video modality input is assigned, namely, a situation where an audio signal is not assigned, when a lip video v is input, the video encoder 110 may extract visual feature information $f_v$ for voice recognition.

Subsequently, when the visual feature information $f_v$ is input, the modality reconstructor 130 may generate reconstruction voice feature information $f'_a$.

Subsequently, the video-audio decoder 150 may connect the visual feature information $f_v$ with the reconstruction voice feature information $f'_a$ to generate a multi-modality feature and may output a character string $\hat{y}$ which is a voice recognition result, based on the generated multi-modality feature.

Figure 3:
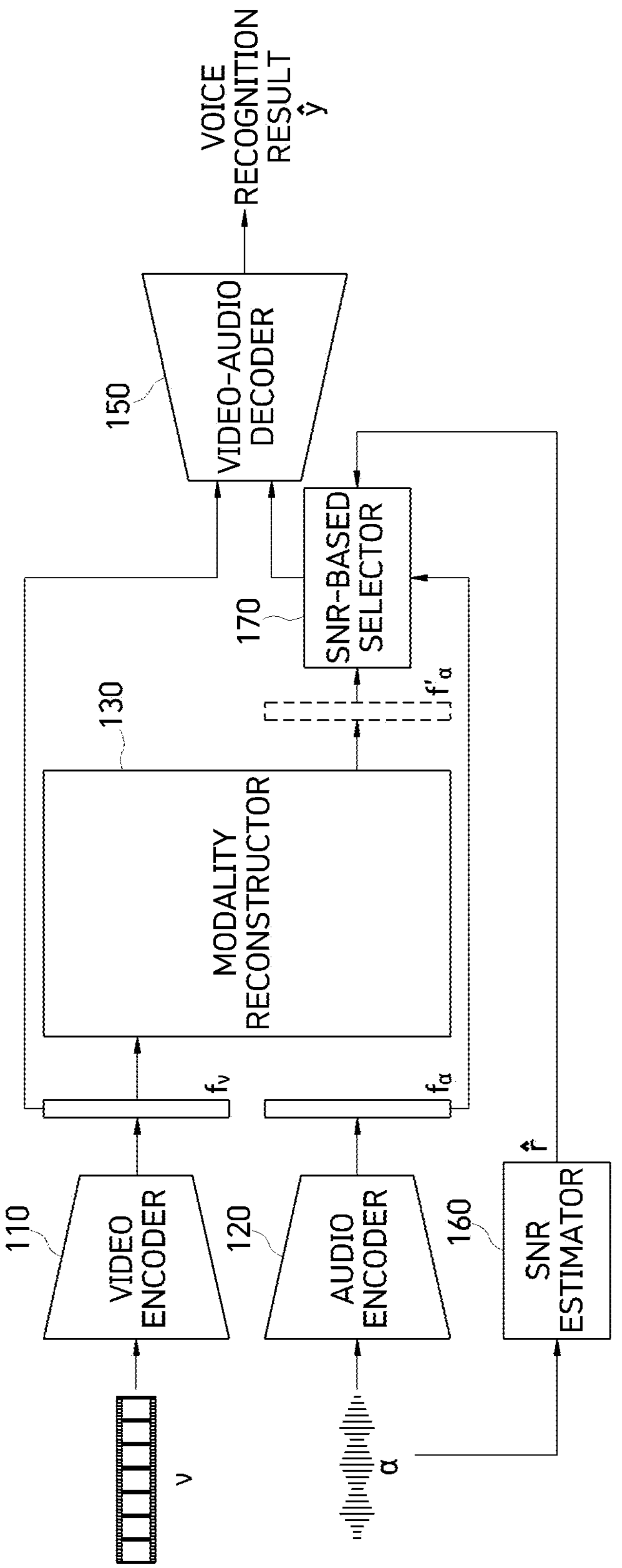
FIG. 3 is a diagram for describing an application embodiment of a voice recognition device based on a video-voice modality input according to an embodiment of the present invention.

FIG. 3 is a diagram for describing an application embodiment of a voice recognition device 100 based on a video-voice modality input according to an embodiment of the present invention.

In a situation where a video and a voice are assigned after learning on the voice recognition device 100 is completed, the voice recognition device 100 may extract visual feature information $f_v$ and voice feature information $f_a$, based on an encoder for each modality.

In addition, a voice may be input to the SNR estimator 160, and the SNR estimator 160 may extract an SNR of the voice.

The modality reconstructor 130 may receive the extracted visual feature information $f_v$ to generate reconstruction voice feature information $f'_a$.

When an SNR estimation value of the SNR estimator 160 is greater than a predetermined threshold value, an SNR-based selector 170 may select voice feature information $f_a$ which is an output of the audio encoder 120. On the other hand, when the SNR estimation value is less than or equal to the predetermined threshold value, the SNR-based selector 170 may select the reconstruction voice feature information $f_a$ because the reliability of a voice is low.

Subsequently, the video-audio decoder 150 may connect the visual feature information $f_a$ with one $f_a$ or $f'_a$ of the selected voice feature information and reconstruction voice feature information to generate a multi-modality feature and may output a character string ŷ which is a voice recognition result, based on the generated multi-modality feature.

Figure 4:
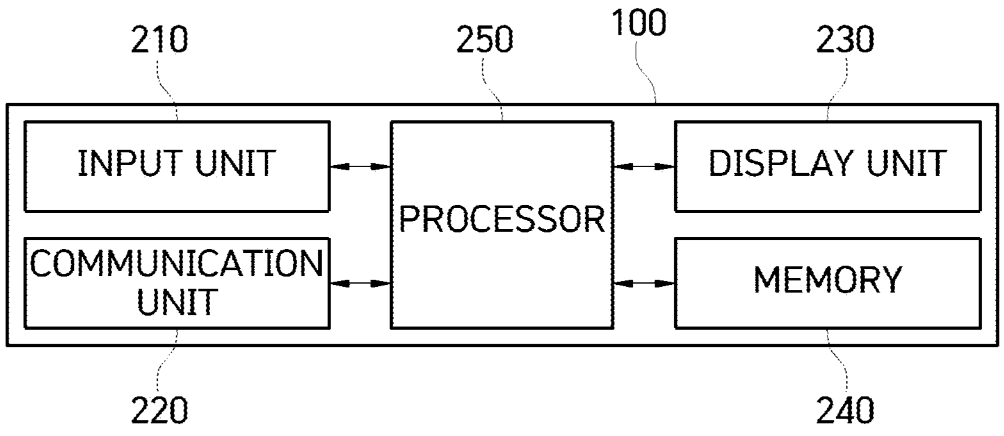
FIG. 4 is a block diagram of a voice recognition device according to an embodiment of the present invention.

FIG. 4 is a block diagram of a voice recognition device 100 according to an embodiment of the present invention.

Referring to FIG. 4, the voice recognition device 100 according to an embodiment of the present invention may include an input unit 210, a communication unit 220, a display unit 230, a memory 240, and a processor 250.

The input unit 210 may receive only a video, or may receive a video and a voice. The video may be a video which includes a lip action of a user. Also, the input unit 210 may generate input data, based on a user input of the voice recognition device 100. The user input may include a user input corresponding to data which is to be processed by the voice recognition device 100.

The input unit 210 may include at least one input means. The input unit 110 may include a keyboard, a keypad, a dome switch, a touch panel, a touch key, a mouse, and a menu button as well as a camera and a microphone.

The communication unit 220 may transmit or receive data between internal elements, or may perform communication with an external device such as an external server. The communication module 220 may include a wired communication module and a wireless communication module. The wired communication module may be implemented with a power cable communication device, a telephone cable communication device, cable home (MoCA), Ethernet, IEEE1294, an integrated cable home network, an RS-485 control device, and/or the like. Also, the wireless communication module may be implemented with a module for implementing a function of each of wireless LAN (WLAN), Bluetooth, HDR WPAN, UWB, ZigBee, Impulse Radio, 60 GHz WPAN, Binary-CDMA, wireless USB technology, wireless HDMI technology, 5th generation communication (5G), long term evolution-advanced (LTE-A), long term evolution (LTE), and wireless fidelity (Wi-Fi).

The display unit 230 may display data based on an operation of the voice recognition device 100. The display unit 230 may display an output of a voice or an input video, or may display a voice recognition result converted into a character string.

The display unit 230 may include a liquid crystal display (LCD), a light emitting diode (LED) display, an organic LED (OLED) display, a micro electro-mechanical system (MEMS) display, and an electronic paper display. The display unit 230 may be coupled to the input unit 210 and may be implemented as a touch screen.

The memory 240 may store programs for training a deep learning model and applying a trained deep learning model in the voice recognition device 100. Here, the memory 240 may be a generic name for a volatile storage device and a non-volatile storage device which continuously maintains information stored therein even when power is not supplied thereto. For example, examples of the memory 240 may include NAND flash memory such as compact flash (CF) card, secure digital (SD) card, memory stick, solid-state drive (SSD), and micro SD card, magnetic computer memory device such as hard disk drive (HDD), and optical disc drive such as CD-ROM and DVD-ROM.

The processor 250 may execute software such as a program to control at least one other element (for example, a hardware or software element) of the voice recognition device 100 and may perform various data processing or arithmetic operations.

Hereinafter, a multi-modality voice recognition method performed by the voice recognition device 100 will be described with reference to FIG. 5.

Figure 5:
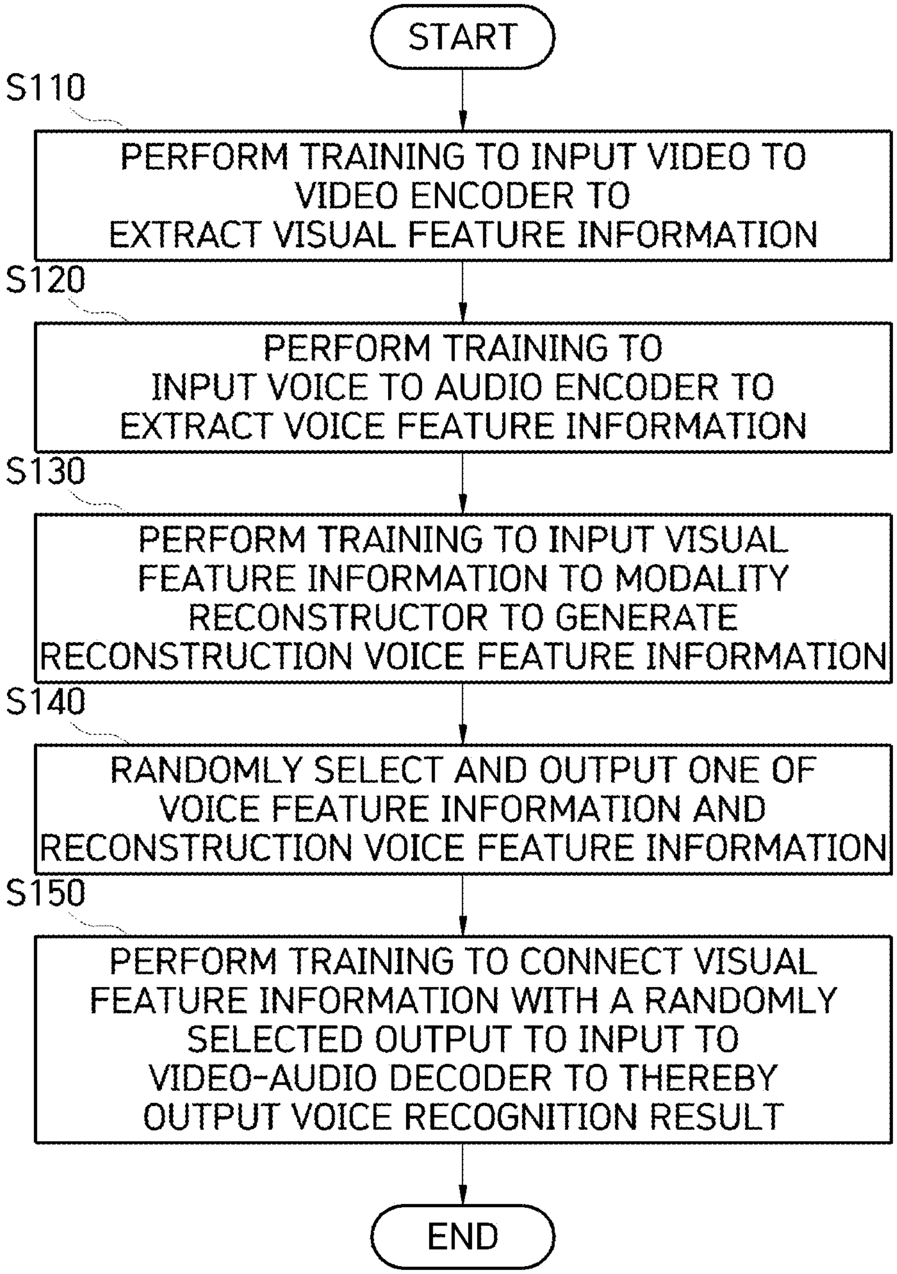
FIG. 5 is a flowchart of a voice recognition method according to an embodiment of the present invention.

FIG. 5 is a flowchart of a voice recognition method according to an embodiment of the present invention.

First, in step S110, the voice recognition device 100 may be trained to input a lip video to the video encoder 110 to extract visual feature information for voice recognition.

Subsequently, in step S120, the voice recognition device 100 may be trained to input a voice to the audio encoder 120 to extract voice feature information for voice recognition.

Subsequently, in step S130, the modality reconstructor 130 may be trained to reconstruct voice feature information from the visual feature information to generate reconstruction voice feature information.

Subsequently, in step S140, one of the voice feature information and the reconstruction voice feature information may be output through the random selector 140.

Subsequently, in step S150, a multi-modality feature where the visual feature information is connected to an output of the random selector 140 may be input to the video-audio decoder 150, and thus, the video-audio decoder 150 may be trained to output a character string which is a voice recognition result.

In the above description, steps S110 to S150 may be further divided into additional steps, or may be combined into fewer steps. Also, depending on the case, some steps may be omitted, and the order of steps may be changed. Despite other omitted descriptions, descriptions given with reference to FIGS. 1 to 4 and descriptions given with reference to FIG. 5 may be applied mutually.

The voice recognition method according to an embodiment of the present invention may be implemented as a program (or an application) and may be stored in a medium, so as to be executed in connection with a computer which is hardware.

The above-described program may include a code encoded as a computer language such as C, C++, JAVA, or machine language readable by a processor (CPU) of a computer through a device interface of the computer, so that the computer reads the program and executes the methods implemented as the program. Such a code may include a functional code associated with a function defining functions needed for executing the methods, and moreover, may include an execution procedure-related control code needed for executing the functions by using the processor of the computer on the basis of a predetermined procedure. Also, the code may further include additional information, needed for executing the functions by using the processor of the computer, or a memory reference-related code corresponding to a location (an address) of an internal or external memory of the computer, which is to be referred to by a media. Also, when the processor needs communication with a remote computer or server so as to execute the functions, the code may further include a communication-related code corresponding to a communication scheme needed for communication with the remote computer or server and information or a media to be transmitted or received in performing communication, by using a communication module of the computer.

The stored medium may denote a device-readable medium semi-permanently storing data, instead of a medium storing data for a short moment like a register, a cache, and a memory. In detail, examples of the stored medium may include read only memory (ROM), random access memory (RAM), CD-ROM, a magnetic tape, floppy disk, and an optical data storage device, but are not limited thereto. That is, the program may be stored in various recording mediums of various servers accessible by the computer or various recording mediums of the computer of a user. Also, the medium may be distributed to computer systems connected to one another over a network and may store a code readable by a computer in a distributed scheme.

The foregoing description of the present invention is for illustrative purposes, those with ordinary skill in the technical field of the present invention pertains in other specific forms without changing the technical idea or essential features of the present invention that may be modified to be able to understand. Therefore, the embodiments described above, exemplary in all respects and must understand that it is not limited. For example, each component may be distributed and carried out has been described as a monolithic and describes the components that are to be equally distributed in combined form, may be carried out.

Conventional voice recognition technology processes an audio signal by mainly using a single modality, but has a problem where performance is largely reduced in a difficult environment such as a plurality of utterers or a low SNR. To overcome such a limitation, the embodiments of the present invention may effectively perform video-based voice recognition and video-voice-based voice recognition by using a single deep learning model, and thus, may simultaneously process input signals in two modalities, thereby enhancing voice recognition performance in various service environments.

Moreover, in conventional technology, a model is configured to be suitable for only a specific modality in a learning step, and due to this, is insufficient in adaptability for a different modality. On the other hand, embodiments of the present invention may robustly respond to various input conditions through learning in multi-modality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A multi-modality voice recognition method performed by a multi-modality voice recognition device, the multi-modality voice recognition method comprising:

- a step of performing training to input a lip video to a video encoder to extract visual feature information for voice recognition;
- a step of performing training to input a voice to an audio encoder to extract voice feature information for voice recognition;
- a step of training a modality reconstructor to reconstruct the voice feature information from the visual feature information to generate reconstruction voice feature information;
- a step of outputting one of the voice feature information and the reconstruction voice feature information through a random selector;
- a step of performing training to input a multi-modality feature, where the visual feature information is connected to an output of the random selector, to the video-audio decoder to output a character string which is a voice recognition result;
- a step of performing training to input the voice to an SNR estimator to estimate a signal to noise ratio (SNR) of the voice;
- a step of inputting a lip video to the trained video encoder to extract visual feature information for voice recognition;
- a step of inputting a voice to the trained audio encoder to extract voice feature information for voice recognition;
- a step of inputting a voice to the trained SNR estimator to estimate an SNR estimation value of the voice;
- a step of inputting the extracted visual feature information to the trained modality reconstructor to extract reconstruction voice feature information;
- a step of selecting voice feature information when the SNR estimation value is greater than a threshold value and selecting reconstruction voice feature information when the SNR estimation value is less than or equal to the threshold value; and
- a step of connecting the selected one of the voice feature information and the reconstruction voice feature information with the visual feature information to input to the trained video-audio decoder to thereby output a voice recognition result.

2. The multi-modality voice recognition method of claim 1, wherein the step of training the modality reconstructor to reconstruct the voice feature information from the visual feature information to generate the reconstruction voice feature information comprises training the modality reconstructor, based on a loss function based on a distance between the visual feature information and the reconstruction voice feature information.

3. The multi-modality voice recognition method of claim 1, wherein the step of performing training to input the multi-modality feature, where the visual feature information is connected to the output of the random selector, to the video-audio decoder to output the character string comprises training the video-audio decoder, based on a loss function configured with a token probability value at an arbitrary time on a right answer and a prediction result, a sum of elements of a token set which is a recognition unit, a length of a token configuring a right answer sentence.

4. The multi-modality voice recognition method of claim 1, wherein the step of performing training to input the voice to the SNR estimator to estimate the SNR of the voice comprises a step of training the SNR estimator, based on a loss function based on a distance between a right answer SNR and an estimation SNR.

5. A multi-modality voice recognition device comprising:

- a video encoder trained to receive a lip video to a video encoder to extract visual feature information for voice recognition;
- an audio encoder trained to receive a voice to extract voice feature information for voice recognition;

a modality reconstructor trained to reconstruct the voice feature information from the visual feature information to generate reconstruction voice feature information;

a random selector configured to randomly output one of the voice feature information and the reconstruction voice feature information;

a video-audio decoder trained to receive a multi-modality feature, where the visual feature information is connected to an output of the random selector, to output a character string which is a voice recognition result;

an SNR estimator trained to estimate a signal to noise ratio (SNR) of the voice as the voice is input, wherein the SNR estimator is trained based on a loss function based on a distance between a right answer SNR and an estimation SNR; and an SNR-based selector configured such that, when an SNR estimation value output from the SNR estimator is greater than a threshold value, the SNR-based selector selects voice feature information, and when the SNR estimation value is less than or equal to the threshold value, the SNR-based selector selects reconstruction voice feature information, wherein the video-audio decoder is further configured to output a voice recognition result based on the selected one of the voice feature information and the reconstruction voice feature information connected with the visual feature information.

6. The multi-modality voice recognition device of claim 5, wherein the modality reconstructor is trained based on a loss function based on a distance between the visual feature information and the reconstruction voice feature information.

7. The multi-modality voice recognition device of claim 5, wherein the video-audio decoder is trained based on a loss function configured with a token probability value at an arbitrary time on a right answer and a prediction result, a sum of elements of a token set which is a recognition unit, a length of a token configuring a right answer sentence.

8. A multi-modality voice recognition method performed by a multi-modality voice recognition device, the multi-modality voice recognition method comprising:

a step of inputting a lip video to a pretrained video encoder to extract visual feature information for voice recognition;

a step of inputting a voice to a pretrained audio encoder to extract voice feature information for voice recognition;

a step of inputting a voice to a pretrained SNR estimator to estimate a signal to noise ratio (SNR) estimation value of the voice;

a step of inputting the extracted visual feature information to a pretrained modality reconstructor to extract reconstruction voice feature information;

a step of selecting voice feature information when the SNR estimation value is greater than a threshold value and selecting reconstruction voice feature information when the SNR estimation value is less than or equal to the threshold value; and a step of connecting one of the selected voice feature information and reconstruction voice feature information with the visual feature information to input to a pretrained video-audio decoder to thereby output a voice recognition result.

* * * * *